July 6, 1965  N. S. KAPANY ETAL  3,192,843
OPTICAL DEVICE

Filed March 12, 1962  3 Sheets-Sheet 1

INVENTORS
NARINDER S. KAPANY
DAVID F. CAPELLARO
BY RALPH G. OSTENSEN

ATTORNEYS

July 6, 1965 N. S. KAPANY ETAL 3,192,843
OPTICAL DEVICE
Filed March 12, 1962 3 Sheets-Sheet 2

INVENTORS
NARINDER S. KAPANY
DAVID F. CAPELLARO
BY RALPH G. OSTENSEN

ATTORNEYS

July 6, 1965  N. S. KAPANY ETAL  3,192,843
OPTICAL DEVICE

Filed March 12, 1962  3 Sheets-Sheet 3

INVENTORS
NARINDER S. KAPANY
DAVID F. CAPELLARO
BY RALPH G. OSTENSEN

ATTORNEYS

United States Patent Office 3,192,843
Patented July 6, 1965

3,192,843
OPTICAL DEVICE
Narinder S. Kapany, Woodside, and David F. Capellaro, Belmont, Calif., and Ralph G. Ostensen, Morton Grove, Ill., assignors, by direct and mesne assignments, to SCM Corporation, a corporation of New York
Filed Mar. 12, 1962, Ser. No. 179,026
1 Claim. (Cl. 95—73)

This invention relates to an improved optical image forming and transferring or transporting device, and more particularly to an improved means consisting of large numbers of light and image transmitting fibers or elements arranged in alternate layers.

Grouping together light conducting elements to function as an image transferring device has been used with a certain degree of success to transfer an image from one plane to another, but the results have not been entirely satisfactory, mainly due to inefficient light transmitting elements. United States Patent No. 1,848,814, issued March 8, 1932 to R. P. Allen for "Image Forming, Transmitting, and Reproducing Apparatus" is typical.

In order to have efficient light transmission which will result in good image resolution, this invention has employed large numbers of individual light conducting fibers which have been arranged in alternate layers of illuminating and imaging fibers, with each layer so arranged as to stagger each individual fiber so that there will be an absolute minimum of space between each fiber. Use of the fiber optics system can increase the light intensity gain by twenty times over the conventional lens system and light transmissibility and image resolution are also materially increased. The primary advantages of the fiber optics system over the conventional reflex system is its ability to record a single side of a document, irrespective of the content of the second side and the wider latitude with respect to the contrast requirements of original and copy material.

Accordingly, the primary object of this invention is to provide an image transferring device capable of economically and efficiently transporting or transferring an image from one plane to another, as from the master copy to a photo-sensitive sheet.

Another object is the provision of a device capable of transmitting light from a source to the master copy through a series of closely positioned rods or filaments of a light conducting material, said illuminating rods or filaments having their two ends positioned in angular relationship to each other.

Still another object of this invention is the elimination of direct heat from the light source to the master copy or the photo-sensitive paper.

A further object of this invention is the use of light transmitting fibers to afford a more evenly distributed illumination over the entire surface of the subject material.

Another object of this invention is the provision of a photocopying device capable of creating an intense light output at the imaging point from the use of a comparatively small lamp light source.

Still another object of this invention is a photocopying device capable of imaging the subject matter of the master copy over to the photo-sensitive copy without the necessity of shining light rays through either copy.

A further object of this invention is the provision of an image transferring and illuminating device comprised of a plurality of closely positioned filaments or fibers of a light conducting material, each filament or fiber having a very thin coating of a material whose index of refraction is significantly different than the filament to create total internal reflection, restrict light leakage from one fiber to another and also act as a cement for binding the fibers into predetermined groups or layers.

These and other objects of the present invention will become more fully apparent from the appended claims and the description that follows when taken in conjunction with the accompanying drawings:

Figure 4:
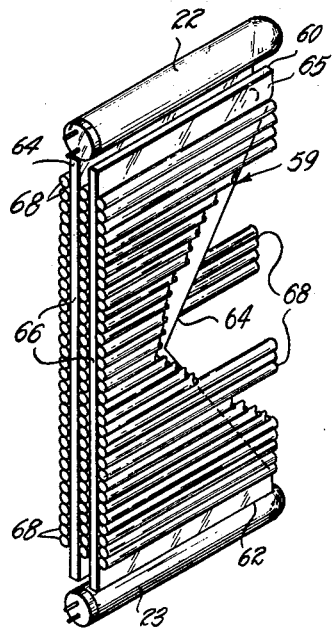
Figure 5:
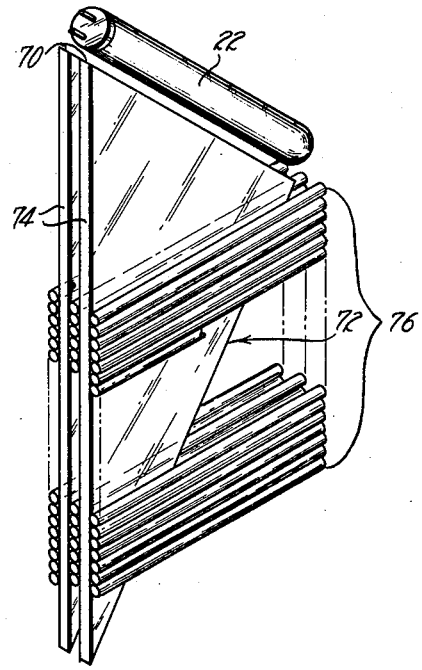

FIGURE 4 is a cut-away drawing of an alternate version showing the illuminating layers as thin sheets of light transmitting material located alternately between layers of imaging fibers; and FIGURE 5 is a cut-away drawing of an alternate version showing the illuminating layers as thin sheets of light transmitting material of a slightly different configuration and also located in alternate layers with the imaging fibers.

Figure 1:
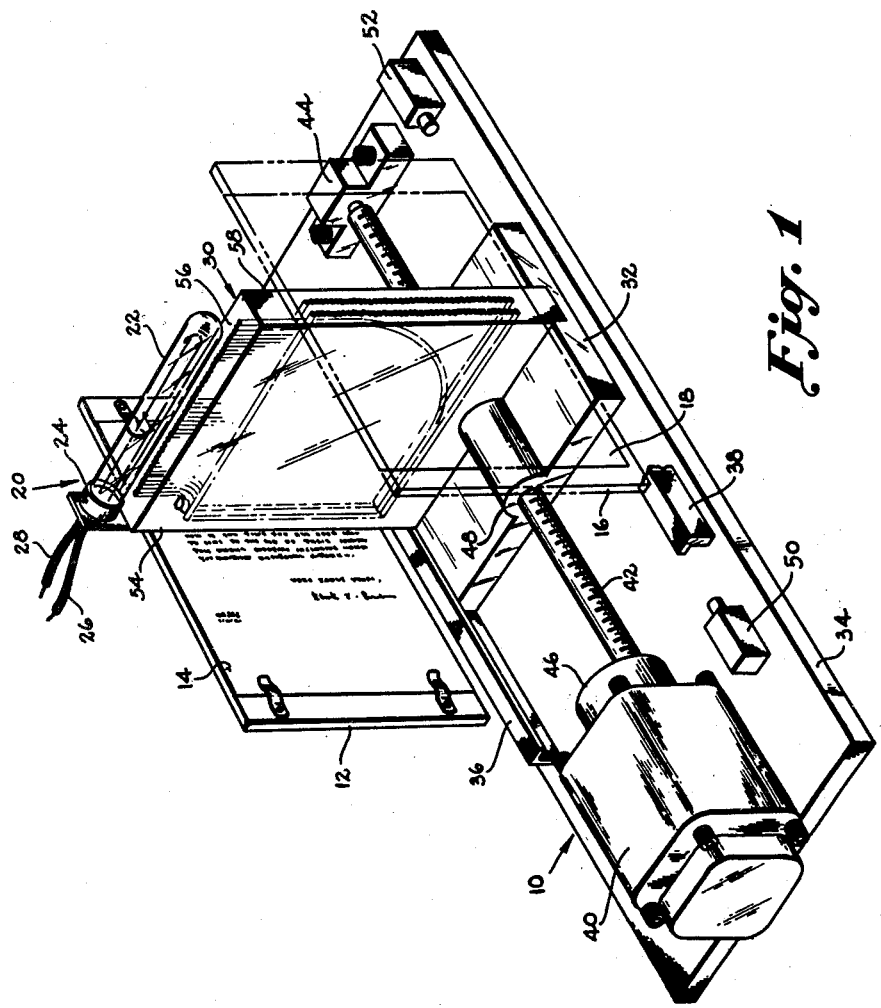
FIGURE 1 is a schematic drawing, in perspective, showing the basic configuration of the present invention.

Referring more in detail to the drawings and particularly to FIGURE 1, the apparatus 10 of the present invention comprises a fixed support 12 for an image bearing "original" or "master" sheet 14, a fixed support 16 for a copy sheet 18 having a layer of photosensitive material, a source 20 of visible light or other suitable radiant energy in the form of a mercury lamp 22 mounted in a socket 24 and energized from a suitable electric power source (not shown) through input leads 26 and 28, and composite illuminating and imaging unit 30. The unit 30 is mounted on a movable support plate 32 which in turn is mounted on fixed base plate 34 for rectilinear reciprocation by opposed parallel guides 36 and 38. Plate 32 is reciprocated by a reversible electric drive motor 40, which is mounted on base plate 34, through lead screw 42 driven thereby. This movement of unit 30 produces synchronized relative motion between it and both the original 14 and copy sheet 18 so that both original 14 and sheet 18 are scanned by it in synchronism.

The axis of lead screw 42 is parallel to the path of motion unit 30. Screw 42 is journalled at one end upon pillow block 44 and fixed at its opposite end to the rotatable output element (not shown) of the reduction gear unit 46 of driving motor 40.

Screw 42 is in threaded engagement with a complementary internally threaded through bore in the boss 48 of plate 32. Motor reversing limit switches 50 and 52 are fixed to base plate 34 at the opposite ends of the path of movement of plate 32 for engagement thereby. Plate 32 engages switch 50 and 52 at the opposite ends of the limits of its travel to terminate the electrical power input to motor 40 and reverse its connections so that it will rotate in the opposite direction when next energized.

Figure 2:
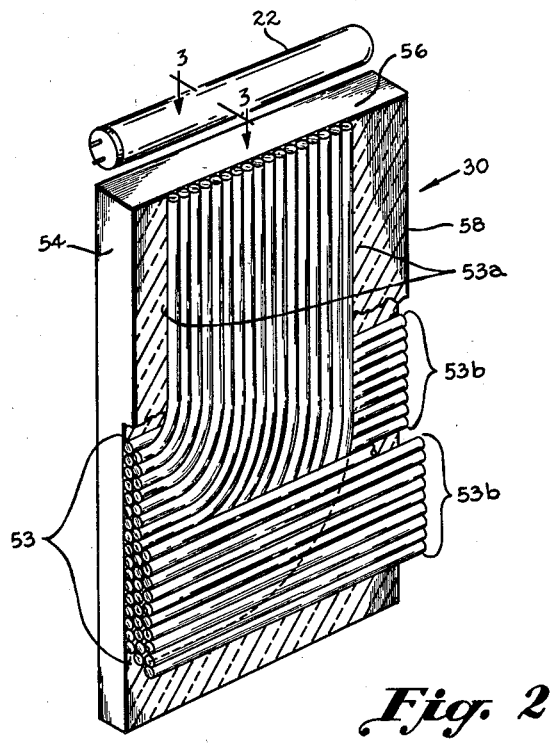
FIGURE 2 is a cut away view of the image block showing but one illuminating fiber layer and two imaging fiber layers for clarity.
Figure 3:
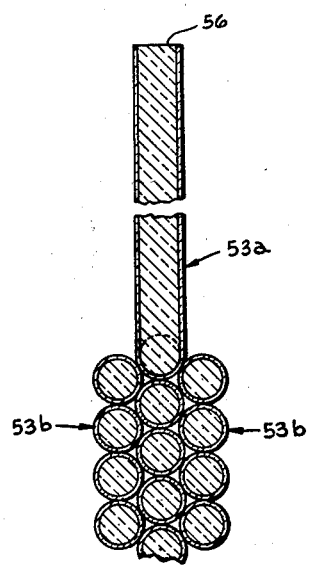
FIGURE 3 is an enlarged section taken along the line 3—3 of FIGURE 2 showing the staggered relationship between the illuminating and imaging fibers.

The structure of the composite illuminating and imaging unit 30 is best shown in FIGURES 2 and 3. Unit 30 comprises a bundle of light conducting fibers 53 all terminating at one end in a common surface 54 and certain ones (53a) of which terminate at their opposite end in a second common surface 56 and the remainder (53b) of which terminate at their opposite ends in a third common surface 58 disposed in offset inclined relation to the second surface 56.

Referring again to FIGURE 1, surface 56 is that which is illuminated by mercury lamp 22, surface 58 is in parallel relation to the adjacent face of the photosensitive copy sheet 18 and the adjacent face of the opaque support 16 on which sheet 18 is mounted, and surface 54 is parallel to the adjacent image bearing face of the "original" or "master" sheet 14 and the adjacent face of the opaque support 12 on which sheet 14 is supported. The supports 12 and 16 and the unit 30 are so mounted that uniform spacing is established and maintained between sheet 14 and surface 54 and between sheet 18 and surface 58 though out of the path of relative scanning motion between unit 30 and supports 12 and 16. Such spacing is maintained at a minimum.

Referring now to FIGURES 1 and 2, light rays impinging upon surface 56 from lamp 22 are directed by fibers 53a through surface 54 against the surface of the sheet 14. Light reflected from sheet 14 will impinge upon the adjacent ends of fibers 53b and be transmitted thereby through surface 58 against the adjacent photosensitive face of copy sheet 18.

In the illustrated embodiment, surfaces 54 and 58 are parallel planar surfaces and surface 56 is normal thereto. The master sheet illuminating fibers 53a are arranged in vertical rows transverse to the path of movement of unit 30 and each row of illuminating fibers 53a is interposed between a pair of vertical rows of image transmitting fibers 53b.

The required cross-sectional dimensions of the fibers 53a and 53b is dependent upon the size of the image and the image resolution required. For copying a typewritten or a printed page using conventionally sized type, fibers having a diameter in the order of .001 to .002 inches have been found to produce very satisfactory results.

Referring to FIGURE 3 which is a greatly magnified cross-sectional view, each fiber 53 is made from a material of high reflective index such as glass, fused quartz, or any of the transparent plastic compositions, which in themselves or when coated with a material whose index of refraction is significantly different from that of the fiber exhibit the phenomenon of total internal reflection. A preferred material for the fiber is methyl methacrylate, commonly known by the trade mark "Lucite." Each fiber 53 is coated with a layer of commercial soda-lime glass. This coating increases the internal reflection of the fiber and restricts light ray leakage from one fiber to an adjacent fiber. The fibers are fusion bonded together by the glass coating. An adhesive may be added to the coating to facilitate the bond. The entire bundle of fibers, after being so assembled, is encapsulated in an epoxy resin. While the coating is preferable, it may be omitted in certain applications depending on the quality of transmission desired.

In the normal copying procedure, the master copy 14 to be copied is attached to the back-up plate 12, which is formed of a non-transparent sheet of material such as steel or the like. The photo-sensitive sheet 18 is attached to its back-up plate 16 which is also of non-transparent material.

The machine 10 is then turned "on." Instantly the mercury lamp light source 22 is energized. The light rays enter the ends of the illuminating fibers 53a through the surface 56 and are directed downward through the curved portions thereof to be emitted at surface 54. The light rays strike the surface of the master copy 14, illuminating the subject matter thereon, said subject matter being then reflected into the ends of the imaging fibers 53b. The said imaging fibers 53b then direct the reflected subject matter through their entire length and the reflected image of the subject matter is transferred to the surface of the photosensitive paper 18. In other words, the intensity of light transmitted by fibers 53b will be dependent upon the quantity of light reflected into them through surface 54. If a given fiber 53a is aligned at a given moment with a portion of a typewritten black character, little or no light will be reflected into it or transmitted by it. If it is aligned with a white portion of sheet 14, the quantity of reflected and transmitted light will be maximum.

With the apparatus 10 turned "on," the motor 40 rotates lead screw 42 and, as it turns in the sliding base plate 32, causes sliding base plate 32 to move toward or away from the motor 40 guided by guide rails 36 and 38.

The image block or unit 30, being attached to the sliding base 32, moves along with its edge surface 54 in close proximity of the master copy 14 and its other edge surface 58 in close proximity of the photosensitive paper 18. The light rays from the mercury light source 22 reflect down through the illuminating fibers 53a, light up the subject matter then being reflected through the imaging fibers 53b and then imaged onto the surface of the photosensitive sheet 18. As the image block or unit 30 moves progressively along, it "reads" or scans the subject matter as it goes and consequently progressively and ultimately projects the complete text from the master copy 14 over to the photosensitive sheet 18. As the sliding base 32 reaches the end of its travel it hits either limit switch 50 or 52, which shuts the machine off. The photosensitive sheet 18 can now be removed from support 16 and developed in the usual manner. The scanning rate will be varied by varying the speed of the motor 40 to accommodate different speeds of copy paper and different types of originals for optimum results.

In the event more than one copy is desired, the master copy 14 is merely left in the machine and another photosensitive sheet 18 is inserted. The machine is again turned on and the cycle is repeated as before except that now the reversible motor 40 is reversed and the sliding base 32 moves in the reverse direction. The image block 30 attached thereto now "reads" the subject matter on the master copy 14 from the opposite edge first, progressing along until the entire subject matter has been transmitted or projected through the imaging fibers 53b to the photosensitive sheet 18. Again, at the end of its travel, the sliding base 32 hits the opposite one of limit switches 50 and 52 which turns the machine off and the photosensitive sheet 18 is ready for removal and developing.

FIGURE 2 shows the image block 30 in section with only one layer of illuminating fibers 53a and two layers of imaging fibers 53b shown for clarity of disclosure. Of course, many more layers of each are actually used to get the proper light intensity and image resolution which in turn will result in a much clearer image on the photosensitive paper 18. In the illustrated form of the invention, all of the fibers 53a must of course, be of a flexible nature due to the necessity of ends of the illuminating fibers 53a being disposed at an angular relationship to one another. Furthermore, each fiber 53a should preferably contact at least one other fiber 53a and also contact two of the fibers 53b thus being interspersed with the fibers 53b.

If the photosensitivity of sheet 18 so requires, the unit is either used in a room devoid of illumination other than lamp 22 which is suitably shielded by a shield (not shown) from sheet 18 or unit 30 is provided with an apertured mask shielding sheet 18 from extraneous light while permitting its exposure to light passing through surface 58.

There may, of course, be many variations of this invention without departing from the essential characteristics thereof, two examples of such being shown in FIGURES 4 and 5. In these two variations thin sheets of light conductive material 64 similar in all respects to the light conductive fibers 53a as shown in FIGURE 2 have been substituted therefor. Here also internal reflection can be greatly enhanced by coating the side walls 65 of each sheet of light conductive material 64 with a very thin coating of material whose index of refraction is significantly different from that of the sheets of light conductive material 64 to cause total internal reflection therein.

When the machine 10 is turned on the two mercury lamp light sources 22 and 23 as shown in FIGURE 4 at both ends of the image block 59 are instantly energized. The light rays enter the upper edges 60 and also the lower edges 62 of the thin sheets of light conductive material 64 and are directed downward from light source 22 and upward from light source 23 to be finally emitted through surfaces 66. As in the principal embodiment of the image block 30 in FIGURE 2 the light rays strike the surface of the master copy 14, illuminating the subject matter thereon, said subject matter being then reflected into the ends of the imaging fibers 68. Here again the imaging fibers 68 direct the reflected subject matter through their entire length and the reflected image of the subject matter is transferred to the surface of the photosensitive paper 18.

In FIGURE 5 light from light source 22 enters upper edges 70 of the thin light conductive sheets 72 and are again directed downward through the full length of the light conductive sheets 72 to be emitted through surfaces 74. Again the light rays strike the surface of the master copy 14, illuminating the subject matter thereon, said subject matter being reflected through the imaging fibers 76 and, as in the other examples, the image is transferred to the photosensitive sheet 18 and the sheet is then removed from the machine 10 and developed in the usual manner. Many of the features found in FIGURE 4 also apply to FIGURE 5 such as coating the side walls 78 of the sheets 72 to produce total internal reflection. Here too, this coating can be of any material whose index of refraction is significantly different from that of the light conductive sheets 72 to produce the desired result.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

In an optical image transfer device, a bundle of light conductive fibers all terminating at one end in a first common surface, a first group of uniformly spaced ones of said fibers extending from said first common surface and terminating at their opposite ends in a second common surface, a second group of uniformly spaced ones of said fibers interspersed with the fibers of said first group, said second group of fibers extending from said first common surface parallel to said first group for a short distance and then curving so that their opposite ends terminate in a third common surface, each fiber of said second group being in contact with at least one other fiber of said second group and at least two fibers of said first group along its end region adjacent said one common surface, means for supporting an image bearing sheet in adjacent uniformly spaced relation to said first common surface, a source of light for uniformly irradiating said opposite ends of said second group of fibers, means for supporting a photo responsive element in uniformly spaced relation to said second common surface for irradiation by any light emitted from said opposite ends of said first group of fibers, and means for producing relative motion between said sheet supporting means and said bundle such that the surface of said sheet is progressively scanned by said one ends of said fibers, said motion producing means alternately producing said relative motion in opposite directions, whereby said relative motion may be oppositely directed for the scanning of successive sheets.

References Cited by the Examiner

UNITED STATES PATENTS

| 1,896,246 | 2/33 | Owens | 88—24 |
| 2,198,115 | 4/40 | John | 88—1 |
| 2,825,260 | 3/58 | O'Brien | 88—1 |
| 2,985,784 | 5/61 | MacNeille | 88—1 |
| 3,060,805 | 10/62 | Brumley | 88—57 |
| 3,125,013 | 3/64 | Herrick et al. | 95—75 |

FOREIGN PATENTS 1,092,955  11/60  Germany.

EVON C. BLUNK, *Primary Examiner.*

JOHN M. HORAN, *Examiner.*